Dec. 21, 1954 M. ZIMBEROFF ET AL 2,697,392
STERILIZABLE PHOTOGRAPHIC APPARATUS
Filed March 10, 1952
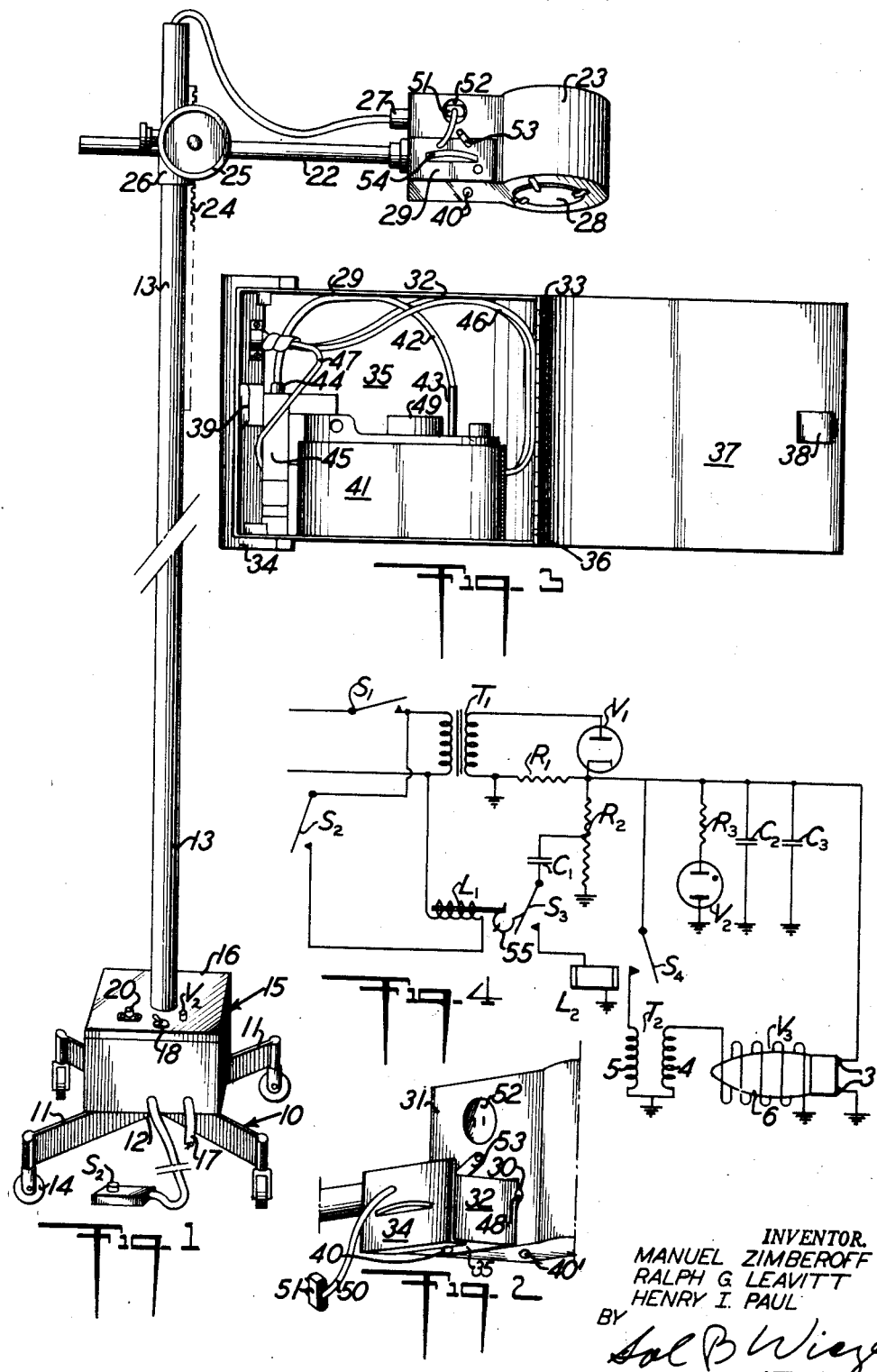
INVENTOR.
MANUEL ZIMBEROFF
RALPH G. LEAVITT
HENRY I. PAUL
BY
ATTORNEY

United States Patent Office 2,697,392
Patented Dec. 21, 1954

2,697,392

STERILIZABLE PHOTOGRAPHIC APPARATUS

Manuel Zimberoff, Ralph G. Leavitt, and Henry Paul, Chicago, Ill.

Application March 10, 1952, Serial No. 275,732

7 Claims. (Cl. 95—11.5)

This invention relates to photographic apparatus and more particularly to apparatus adapted to take photographs in a surgery or nursery, allowing handling and operation of the camera and film in taking the photographs, removal of the camera and film from the apparatus and replacement thereof under aseptic conditions.

One of the features of the present invention is the mounting of the camera and means for operation thereof in photographic use in an aseptically sealed container within a compartment of a supporting apparatus, whereby the camera and equipment for remote actuation thereof within the aseptically sealed container may be withdrawn and reemplaced in the supporting apparatus as an aseptically sealed unit.

Another feature of this invention is directed to a housing comprising the supporting apparatus carrying a speed light, electronic repeating flash or strobe light, said housing further removably carrying a camera aseptically sealed within a container and electrical actuating means for remote actuation of the camera over a series of exposures, together with simultaneous actuation of the lighting means synchronized with the actuation of the camera.

Still another feature of this invention is the portable mounting of said housing and removably sealed camera unit therein, with means for adjusting the housing to correspond with the pre-set focus thereof, the mount being portable and carrying power pack means for actuation of the light and synchronization thereof with the actuation of the camera and external operating switches, all mounted in portable fashion for highest utility for specific photography.

Other objects and features of my invention will be apparent from the detailed description which now follows, taken in conjunction with the appended drawings, in which:

Fig. 1 shows a perspective view of the photographic apparatus;

Fig. 2 shows an enlarged perspective detail of the housing for the sealed unit, with the sealed unit partially withdrawn to show the manner of assembly therewith;

Fig. 3 is a plan view of the aseptic container, with the cover opened, showing the camera and operating elements thereof in operative relationship; and Fig. 4 is a wiring diagram showing the relationship of the electrical elements used for operation and control of the photographic apparatus.

The apparatus comprises a portable base 10 comprising several arms 11 joined centrally at 12 to a vertical, generally cylindrical, shaft 13, each of the arms 11 being supported at their outer edges upon casters 14 for ready portability of the heavy apparatus. Resting upon the crossed arms 11 is a generally cubical container 15 having a cover 16 within which is mounted the heavy electrical elements of the power pack comprising transformers, condensers, relay switches and wiring elements, etc., which are thereby conveniently portably mounted and as located immediately upon the base further act as a ballast, tending to heavily weight the unit for optimum upright stability of the photographic means mounted from the supporting arm 13.

Extending from the power pack is an electrical input line 17. The power unit further has mounted on the top thereof a hand switch 18, a small neon light $V_2$ to indicate that the power unit is ready for operation, and a replaceable overload fuse 20. Further extending outwardly and lying flat upon the floor is a foot switch $S_2$ which actuates the camera and mechanism when in focused position and ready for photographic actuation of the light and camera.

Mounted upon the upper end of support shaft 13 by way of a bracket arm 22 is the housing 23 bearing photographic elements. The housing 23 is vertically adjustable to desired focus upon the shaft 13 through a pinion and rack gear 24 actuated by hand wheel 25 secured in operative position thereabout by cylindrical universal type clamping elements 26. The housing is vertically adjustable upon the support 13 by rotation of hand wheel 25 which actuates a pinion (not shown) against the rack 24. The electrical wiring extending through the hollow support 13 terminates in a universal female type plug 27 such as a Jones plug for attachment of the several electrical operating wires thereto. Mounted within the outer end of housing 23 is a strobe, or trigger type flash tube 6 within a conventional reflector protectively covered by glass plate or transparent plastic 28.

The portable aseptically sealed unit container 29, according to the present invention, may be rectangular or modified to other shape as desired. As shown herein, it has the appearance of a rectangular drawer 29 mounted within a correspondingly rectangular aperture 30 present in the portion of the housing 31 nearest the supporting elements 22. As shown in Fig. 3, the sealed container unit 29 comprises side members 32, a rear end member 33, a front end member 34, and a bottom member 35. Hinged to the center of the end member 33 through piano or other suitable type hinge member 36 is a cover 37 having a locking means 38 on the cover cooperating with the securement means thereof 39 mounted in the forward end portion 34 of the container unit 29. The bottom of the unit 35 has a small aperture 40 over which the camera lens fits when operatively mounted within container 29 and which may be further sealed with glass or other transparent material, or the aperture sealing means may be omitted, inasmuch as the camera 41 is more or less permanently fixed within the container unit 29 over the aperture 40 which is not, therefore, a substantial source of contamination.

The bottom of the housing 23 has a corresponding aperture 40' aligned with aperture 40 when the container 29 and camera is placed within the housing 23, the camera exposure thereby being effected through apertures 40 and 40'.

The sealed box 29 has mounted therein a Robot camera 41 which, as known in the art, is automatic to the extent that, after actuation of the shutter mechanically, it has a clockwork mechanism mechanically actuated by a spring which will reset the film for a new exposure, winding the exposed film upon one spool and unwinding new film from a supply spool and which is operative after closure of the shutter of the camera immediately following the film exposure. The camera shutter 55 itself is actuated by a flexible sliding shaft disposed within a flexible cable 42, one end of which, 43, contacts the camera for actuation of the shutter, and the other end of which, 44, is attached to the armature $L_1$ of a solenoid 45. Thus, upon supplying current to the windings of the solenoid, the armature thereof imparts a thrust to the flexible shaft within the cable 42, contacting the camera at 43 and actuating the shutter mechanism 55 of the camera in a manner typical of conventional plunger-type camera actuation.

The shutter of the camera (Fig. 4) carries an electrical contact, so that at the instant of opening, it completes a circuit through synchronizing wires 46, which triggers the supply of sufficient momentary power to the strobe lamp $V_3$ to supply a flash of light for photographically illuminating the subject to be photographed, in a manner illustrated hereinafter. The solenoid 45 is actuated by an ordinary electric current directly input from line 17, such as 115 volt A. C. current supplied thereto through line 47 mounted within container 29 and completed through the windings of the solenoid 45 by grounding.

Thus, in broader features of operation, the solenoid is directly actuated by foot switch $S_2$, completing the circuit for current supplied therethrough, which in turn by a thrust of the solenoid armature, actuates the camera mechanically through cable 42, the opening of the shutter of the camera in turn triggering the synchronizing current impulse through line 46 by closing of switch $S_3$ to operate the strobe lamp 6 through actuation of the power circuit as hereinafter explained.

The camera, a known Robot type of camera, is mechanically actuated by a torsion spring set for operation by winding knob 49, loaded with film and then secured within the container 29 by securing stud 48. The box 29 is then closed by locking the cover 37. The closed container 29 after setting the camera and film therein for use may be sterilized by wiping with sterilizing or antiseptic fluid such as alcohol to convert the exposed outer surfaces of the box to aseptic condition, with the cover 37 securely locked by lock and latch mechanism 38 and 39. The aseptic box containing the camera and actuating elements are then handed in aseptic condition to the nurse or nursery attendant for normal use. The nurse then takes container 29 and inserts it into the housing 30 in the manner shown in Fig. 2, with container fixed in the side 31 of the housing 23. As shown in Fig. 2, the electric wires extend from the container 29 as a combined electric wire cable 50 terminating in a male plug 51 have the several circuits completed to the housing by insertion of the plug into the corresponding female plug 52 of the housing. The container may be finally secured within the housing by an outer latching means 53. Any suitable handle means 54 may be mounted upon the outer end 34 of the container. In this position the photographic apparatus is ready for use.

Referring to Fig. 4, a conventional circuit is illustrated for operating the power unit and trigger-type flash tube. In general summary of this circuit, it is reviewed, as suggested above, that an electric current, typically 115 volt A. C., is supplied directly to the solenoid 45 for actuation by the foot switch $S_2$. The closing of the circuit by the foot switch is intended to actuate the Robot camera by directly opening the shutter by thrust of the solenoid armature. The armature and camera shutter simultaneously close a switch, completing the power circuit to the trigger-type flash tube, causing it to flash while the shutter is open. As specifically shown in Fig. 4, the power circuit is first activated by closing of the hand switch 18 (Fig. 1) shown in the diagram (Fig. 4) as $S_1$, which energizes the transformer $T_1$ and selenium rectifier $V_1$, which, together with resistor $R_1$, acts as a half-wave rectifier, charging capacitators $C_2$ and $C_3$ and causes the neon bulb $V_2$ to glow, thereby indicating the power circuit to be operative, i. e., ready for use.

A small current drains through voltage divider $R_2$, which is immediately detached at 18 volts into a branch circuit containing capacitor $C_1$, a D. C. relay $L_2$, energized by D. C. condenser through voltage divider $R_2$ when switch $S_3$ is closed. The terminals 3 of flash bulb 6 are connected to the output of the half-wave rectifier and to ground. An "ionizing coil" $V_3$ is disposed about the flash bulb 6 and is connected to the secondary 4 of a transformer $T_2$, the primary 5 of which is connected between the rectifier $V_1$ and ground when a switch $S_4$ is closed. In operation, with power switch $S_1$ closed, neon bulb $V_2$ glows and capacitators $C_2$ and $C_3$ charge up. When foot switch $S_2$ is closed, the solenoid $L_1$ (45) is excited, forcing its armature to open camera shutter 55 and bearing against switch $S_3$, closes the same and causes relay $L_2$ to be energized, thereby closing switch $S_4$. When switch $S_4$ is closed, the charged capacitators $C_2$ and $C_3$ have a low resistance path to ground through the primary winding 5 of $T_2$ and accordingly discharge through it. This surge of current induces a temporarily very high voltage across the stepped-up secondary 4 of the transformer $T_2$ and thereby develops a desirable high voltage at the ionizing coil $V_3$ of the bulb 6, causing it to discharge capacitators $C_2$ and $C_3$ through the flash tube and thus momentarily to flash, and providing the desirable photographic light effect substantially instantaneously with the actuation of the camera. The closure of the camera shutter is automatic and simultaneously actuates the Robot mechanism in the camera to cause the exposed film to immediately change to a new setting of unexposed film.

In use of this device in a nursery or surgery, the camera 41 prior to inserting within the box 29 has its focus normally adjusted and is charged with film. After inserting the closed box in aseptic form into the housing 30, the height of the housing is set to the predetermined camera focus by adjustment of the hand wheel 25, which raises and lowers the same. If, for example, a new-born baby in a crib is to be photographed, the crib is placed beneath the camera. A series of pictures may be taken in the nursery or surgery, as desired, until the supply of film in the camera 41 is exhausted by mere actuation of the foot switch to obtain the desired number of exposures in sequence. Thereafter, the nurse removes the entire sealed box 29 and passes the same outside the nursery to an attendant, who will supply her with a new box 29 having a camera freshly charged with film and aseptically sealed.

The attendant sends the entire box to the studio, where the camera is removed, the film withdrawn, processed and new film placed therein, sealed and returned to the hospital, i. e., the nursery or surgery. In this manner, it is never necessary for a photographer of particular skill to enter the surgery, and it is never necessary for the camera itself to be removed for recharging with film within the nursery, so that surgical photography is readily carried in an entirely aseptic manner by hospital personnel relatively unskilled in photography.

It will be understood that while it is essential that a Robot type of camera be used herewith, and that it be mounted in a circuit synchronized with the actuation of the light, certain modifications in the power circuit are possible, the circuit set forth herein being typical of many available in the art for actuation of a repeating flash or strobe light electronically. Certain modifications in the shape of housing, the shape of the sealed camera enclosed unit are possible, as well as means for adjusting the position of the housed light and camera for photographing objects within the nursery or surgery in various positions.

It is accordingly intended that the description herein given be regarded as illustrative and not limiting except as defined in the claims appended hereto.

We claim:

1. Photographic apparatus adapted for use under sterile conditions comprising a housing enclosing a camera container chamber, an electronically repeating flash tube mounted within said housing beside said chamber, means for adjusting the position of said housing to proper focus of a camera in said chamber, a readily portable externally sterilizable container mounted in said housing within said chamber, said portable container having a hinged cover aseptically sealing the contents thereof, a camera rigidly mounted over an aperture in one surface of said container, with the lens thereof fixed over said aperture to substantially seal the same, a solenoid mounted beside said camera, a longitudinally movable flexible shaft mounted with one end aligned for axial thrust by the armature of said solenoid and the opposite end in cooperating thrust relationship with the shutter of said camera, said camera shutter bearing electrical contacts for completion of an electrical circuit by opening thereof and electrical leads projecting from said container comprising conduit wires for actuation of said solenoid and comprising conduit wires in circuit with said shutter coacting contacts, said camera having means operative automatically on each exposure to reset the camera with unexposed film, a power pack in circuit with said shutter contact wires and with the electronic repeating flash lamp in said housing, and switch means for remotely actuating the circuit through said solenoid whereby actuation of said solenoid actuates the camera and synchronously actuates said electronic flash tube in photographic use.

2. Photographic apparatus adapted for use under sterile conditions comprising a supporting base mounted on casters for sliding portability having a power pack unit mounted thereon and an upright shaft supported by said base, a housing adjustably mounted on the upper end of said shaft, said housing carrying an electronically repeating flash tube connected with said power pack unit for instantaneous illumination thereof, said housing forming a chamber beside said flash tube, an aseptically sealed readily portable container removably mounted within said chamber and having lead wires extending therefrom completing electrical circuits therethrough to said housing terminating in an electrical connector plug, an automatically resetting camera mounted within said container, an electrical means for remote actuation of said camera through said lead wires, a second electrical means carried by said camera for synchronizing the operation thereof with the power circuit to said flash lamp and a foot switch extending from said base to said power unit for completing an electrical circuit to remotely actuate said camera and illumination means synchronized therewith.

3. Photographic apparatus adapted for use under sterile conditions comprising a supporting base, an electronic power pack unit carried immediately upon said base, a vertical shaft mounted upright from the center of said base, a housing supported vertically adjustable from the upper end of said shaft, said housing enclosing a chamber and an electronically repeating flash tube beside said chamber, an aseptically sealed removable container mounted within said chamber, both of the bottom walls of said chamber and of said container having apertures positioned for alignment when said container is placed within said chamber, a camera having means to automatically reset the film after each exposure mounted within said chamber with the lens mounted over said aperture, a solenoid mounted beside said camera adapted upon being energized to actuate the camera shutter, a pair of switch contacts associated with the shutter of said camera completing an electrical circuit therethrough when the shutter of said camera is opened, the several electrical lead wires to said solenoid and said shutter contacts projecting aseptically from said removable container and terminating in a multiway plug, said power pack being electrically connected to said electronic repeating flash tube in said housing and adapted to provide sufficient instantaneous electrical power to cause said light to flash momentarily and having the circuit thereto completed through a lead plug in said housing connectable in use to the cooperating plug carrying the lead wires from said portable container for synchronization thereof, whereby actuation of said camera shutter synchronously completes said power circuit, said solenoid being connected in circuit with a foot actuating switch extending from a lead wire in said base whereby the entire circuit becomes photographically operative by actuation of said foot switch to activate said solenoid.

4. Photographic apparatus adapted for photographic use under completely sterile conditions comprising a housing enclosing a chamber, an electrically actuated flashlight in said housing beside said chamber, a magazine comprising a readily portable container formed of rigid continuous walls completely enclosed on all sides removably mounted in said chamber, said magazine having aseptically sealed therein a camera, an electrically actuated solenoid mounted in said container to actuate the shutter of said camera, said camera having means synchronized with the actuation of said shutter for automatically resetting the film therein after exposure for continued photographic use, the walls of said magazine having a small aperture cooperating with the lens of said camera to admit light thereto and an aperture through which an electric lead wire is sealed, the walls of said container being otherwise rigid and imperforate whereby said magazine may be externally sterilized with the camera and automatic operating mechanism therefor sealed therein in non-sterile condition and electrical circuit means synchronously actuating said flashlight and camera in photographic use thereof.

5. Photographic apparatus adapted for photographic use under completely sterile conditions comprising a vertical support, a vertically adjustable housing mounted on said vertical support for vertical adjustment thereof to photographic focusing position, said housing enclosing an electrically actuated repeating photographic flashlight and further enclosing a chamber, an electrical power unit in circuit with said electrical flashlight, a magazine comprising a readily portable container formed of continuous self-supporting walls completely closed on all sides mounted in said chamber, said magazine having aseptically sealed therein a camera and a solenoid mounted to actuate the shutter of said camera, said camera having means synchronized with the actuation of said shutter for automatically resetting the film therein after exposure, the walls of said magazine being only apertured sufficient to admit light to the lens of said camera placed over said aperture to otherwise seal the same and to pass electrical lead wires through a wall of said magazine in substantially sealing fit therethrough, the walls of said container being otherwise imperforate whereby said magazine may be externally sterilized with the camera and automatically operating mechanism therefor sealed therein in non-sterile condition, and an electrical circuit means synchronously actuating said electrical power means and solenoid in photographic use thereof.

6. Photographic apparatus adapted for ready maintenance in sterile condition and sterile use for surgery and nursery photography comprising the combination of a housing and a vertical support therefor having means to adjust the height of said housing for focus of a camera therein, a camera and automatic electronic repeating flashlight mounted adjacent to each other within said housing, said camera being movably and portably mounted within a magazine supported in a chamber in said housing and associated with a solenoid for remote electrical operation thereof, switch means in said magazine cooperating with said camera for synchronization of the operation thereof with the electronic repeating flashlight, short lead wires passing through a wall of said magazine adapted to supply current for actuation of said solenoid and said camera synchronizing circuit terminating outside of said magazine in a detachable electrical connector plug for completing circuits therethrough to said housing, an electronic power pack supported by said support having remote switch actuating means completing the circuit both through said power pack and solenoid, said camera having automatic means to reset film therein, said magazine being readily removed from said chamber together with electrical lead wires and plug and handled as a readily externally sterilizable self-supporting container bearing the camera and solenoid as a subassembly for remote processing of film therein.

7. Device as defined in claim 6 wherein the entire combined assembly of units is portably slidable upon casters.

References Cited in the file of this patent

UNITED STATES PATENTS

| Number | Name | Date |
|---|---|---|
| 2,408,764 | Edgerton | Oct. 8, 1946 |
| 2,431,825 | Pollock | Dec. 2, 1947 |
| 2,464,067 | Barker | Mar. 8, 1949 |
| 2,537,303 | Cobb et al. | Jan. 9, 1951 |